US012272193B2

(12) United States Patent
Mills

(10) Patent No.: US 12,272,193 B2
(45) Date of Patent: Apr. 8, 2025

(54) REMOTELY OPERATED CARGO LOCK DEVICE

(71) Applicant: Ronald Mills, Houston, TX (US)

(72) Inventor: Ronald Mills, Houston, TX (US)

(*) Notice: Subject to any disclaimer, the term of this patent is extended or adjusted under 35 U.S.C. 154(b) by 49 days.

(21) Appl. No.: 18/239,979

(22) Filed: Aug. 30, 2023

(65) Prior Publication Data
US 2025/0078590 A1    Mar. 6, 2025

(51) Int. Cl.
*G06Q 10/08*    (2024.01)
*B60R 25/10*    (2013.01)
(Continued)

(52) U.S. Cl.
CPC ...... *G07C 9/00182* (2013.01); *B60R 25/1001* (2013.01); *B60R 25/102* (2013.01);
(Continued)

(58) Field of Classification Search
CPC . H04W 12/0433; H04W 4/029; H04W 88/02; H04L 2209/80; H04L 67/306; H04L 9/3228; G09F 3/0329; G09F 3/0335; G09F 3/0358; G08B 13/128; G08B 3/00; E05B 2047/0094; E05B 2047/0096; E05B 2047/0097; E05B 39/00; E05B 39/005; E05B 67/063; E05B 67/22; E05B 83/02; E05B 83/08; B60R 2325/105; B60R 25/1001; B60R 25/102; G01S 19/16; G01S 19/13; G01S 5/0027; G07C 2009/0092; G07C 9/00309; G07C 9/00571; G07C 2009/00373; G07C 2009/00396; G07C 2009/00412; G07C 2009/00642; G07C 2009/00753; G07C 2009/00769; G07C 2009/00793; G07C 2011/02; G07C 9/00174; G07C 9/00182; G07C 9/00714; G07C 9/00817; G07C 9/00896; G07C 9/00912; G07C 9/00944; G07C 9/27; G07C 9/28; G06Q 10/0832; G06Q 10/00; G06Q 10/0833; G06Q 10/087; A47G 2029/145;
(Continued)

(56) References Cited

U.S. PATENT DOCUMENTS 5,640,139 A * 6/1997 Egeberg ............... B60R 25/102
340/988
D807,151 S    1/2018 Kuu
(Continued)

FOREIGN PATENT DOCUMENTS

WO    WO2019010480    1/2019

*Primary Examiner* — Dionne Pendleton

(57) ABSTRACT

A remotely operated cargo lock device for securing cargo in a cargo trailer includes a first personal electronic device carried by a driver of a cargo vehicle and a second personal electronic device carried by a cargo authority. A padlock is attachable to a handle of a cargo trailer door thereby inhibiting the handle from is manipulated into an open position thereby securing cargo in the cargo trailer. The padlock includes a communication unit in remote communication with the extrinsic communication network. The padlock is actuated into an unlocked condition when the communication unit receives an unlock command from the second personal electronic device to facilitate the cargo authority to unlock the handle of the cargo trailer to facilitate the cargo in the cargo trailer to be unloaded.

6 Claims, 8 Drawing Sheets

(51) Int. Cl.
    *B60R 25/102*     (2013.01)
    *G07C 9/00*     (2020.01)

(52) U.S. Cl.
    CPC .................. *G07C 9/00896* (2013.01); *G07C 2009/00587* (2013.01); *G07C 2009/00769* (2013.01); *G07C 2009/0092* (2013.01)

(58) Field of Classification Search
    CPC .......... A47G 2029/149; A47G 29/141; G06K 19/06037
    See application file for complete search history.

(56) References Cited

U.S. PATENT DOCUMENTS

| | | |
|---|---|---|
| 10,262,484 B2 | 4/2019 | Conrad |
| 11,880,804 B1 * | 1/2024 | Sleeman ............... G06Q 10/087 |
| 2004/0108938 A1 * | 6/2004 | Entrekin ............ G07C 9/00309 |
| | | 340/5.73 |
| 2007/0018787 A1 | 1/2007 | Martinez de Velasco Cortina et al. |
| 2018/0240065 A1 * | 8/2018 | Hilsley ............... G06Q 10/0832 |
| 2020/0160263 A1 * | 5/2020 | Kuettner ............ G06Q 10/0832 |
| 2020/0226954 A1 | 7/2020 | Sengstaken |
| 2022/0319263 A1 | 10/2022 | Scott |

* cited by examiner

REMOTELY OPERATED CARGO LOCK DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cargo lock devices and more particularly pertains to a new cargo lock device for securing cargo in a cargo trailer. The device includes a padlock which has a communication unit that is in wireless communication with a first personal electronic device and a second personal electronic device. The first personal electronic device is assigned to a driver who locks the padlock and the second personal electronic device is assigned to a cargo authority who unlocks the padlock.

(2) Description of Related Art Including Information Disclosed Under 37 CFR 1.97 and 1.98

The prior art relates to cargo lock devices including a variety of electronic locks for securing a door of a cargo trailer that can be remotely unlocked via wireless communication and an electronic cargo lock that includes an RFID reader for unlocking and an electronic seal device for sealing a door of a cargo trailer. In no instance does the prior art disclose an electronic cargo lock that includes a padlock that is in wireless communication with a first personal electronic device assigned to a driver and a second personal electronic device assigned to a cargo authority.

BRIEF SUMMARY OF THE INVENTION

An embodiment of the disclosure meets the needs presented above by generally comprising a first personal electronic device carried by a driver of a cargo vehicle and a second personal electronic device carried by a cargo authority. A padlock is attachable to a handle of a cargo trailer door thereby inhibiting the handle from is manipulated into an open position thereby securing cargo in the cargo trailer. The padlock includes a communication unit in remote communication with the extrinsic communication network. The padlock is actuated into an unlocked condition when the communication unit receives an unlock command from the second personal electronic device to facilitate the cargo authority to unlock the handle of the cargo trailer to facilitate the cargo in the cargo trailer to be unloaded.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
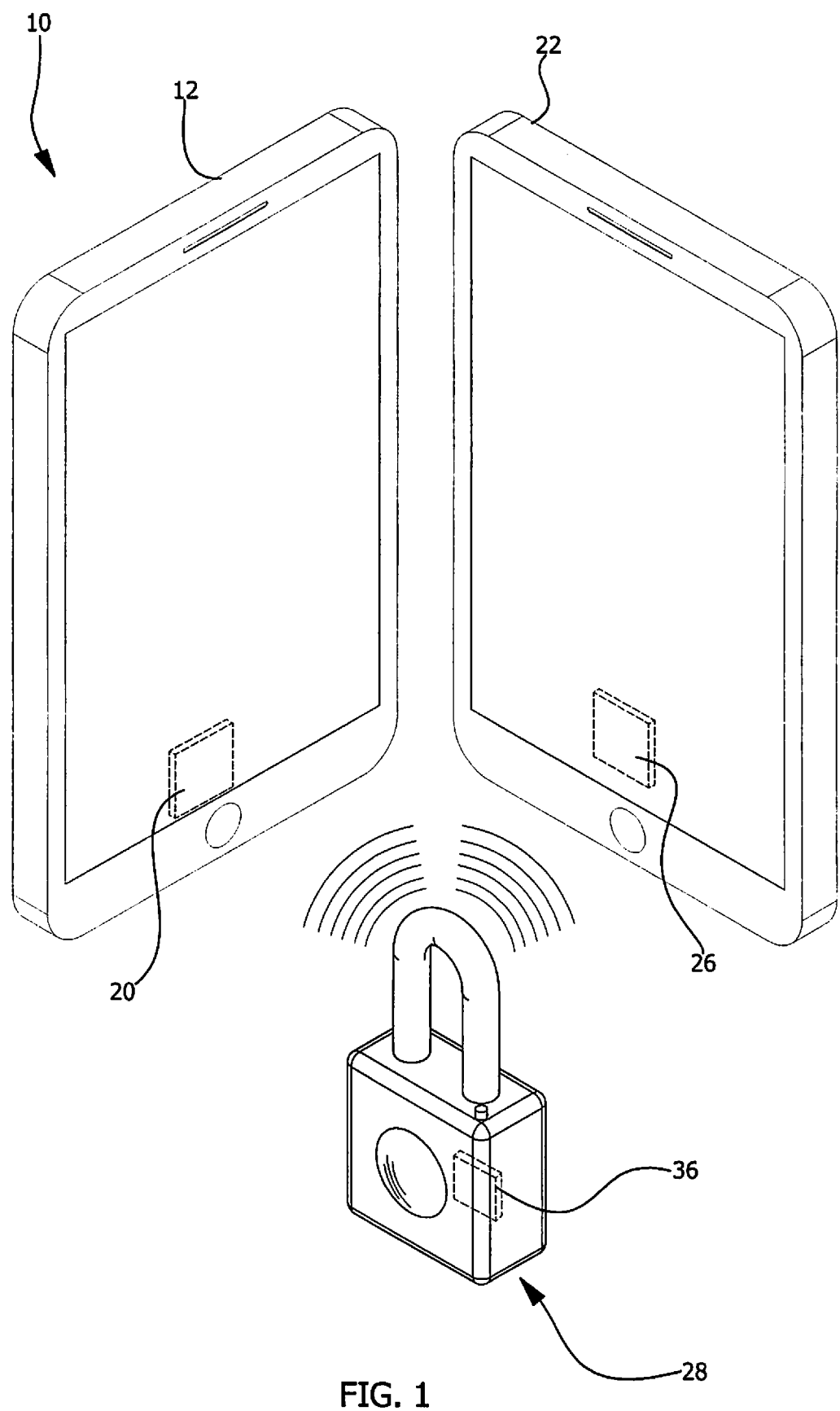
FIG. 1 is a perspective view of a remotely operated cargo lock device according to an embodiment of the disclosure.
Figure 2:
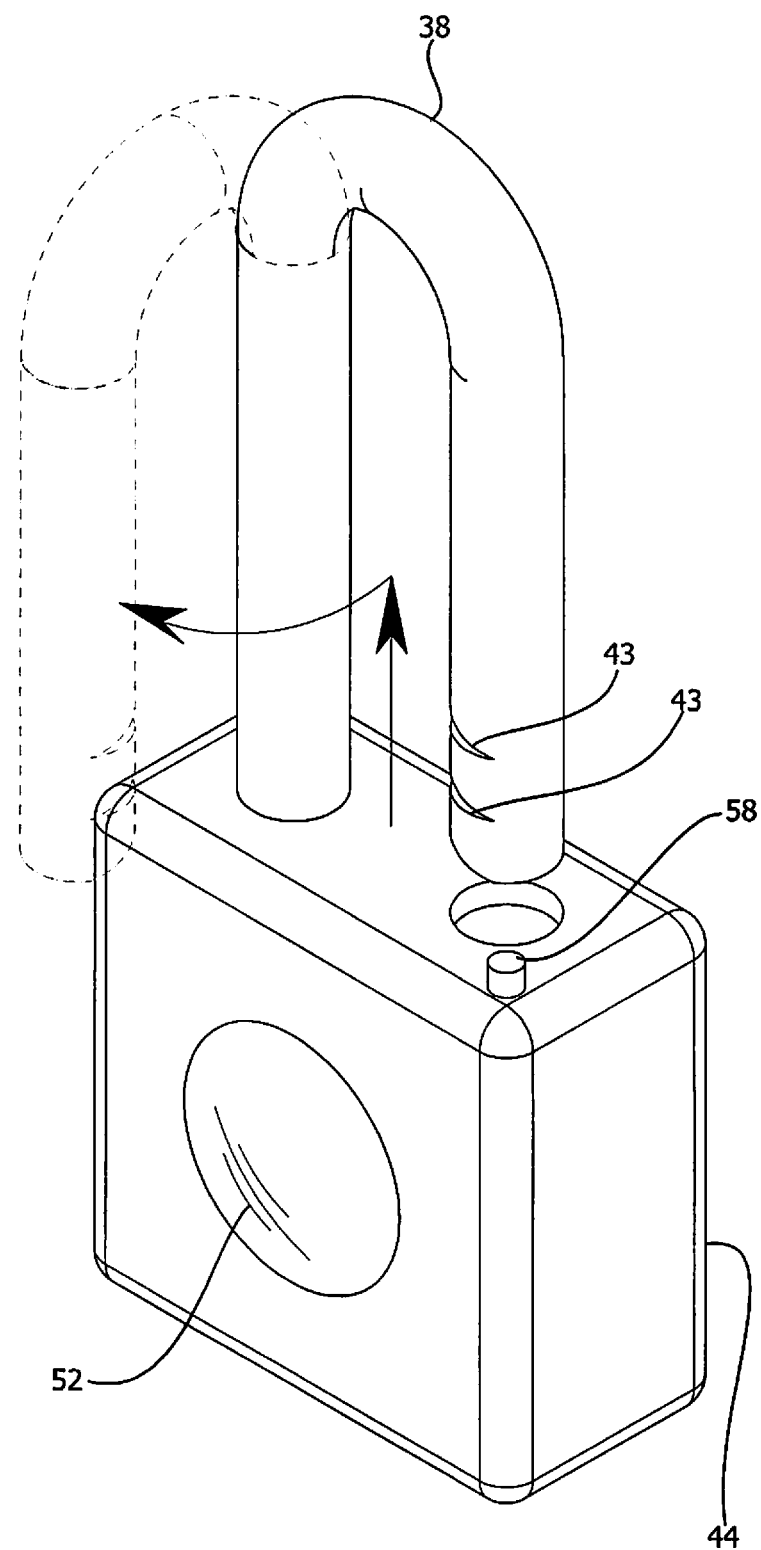
FIG. 2 is a front perspective view of a padlock of an embodiment of the disclosure.
Figure 3:
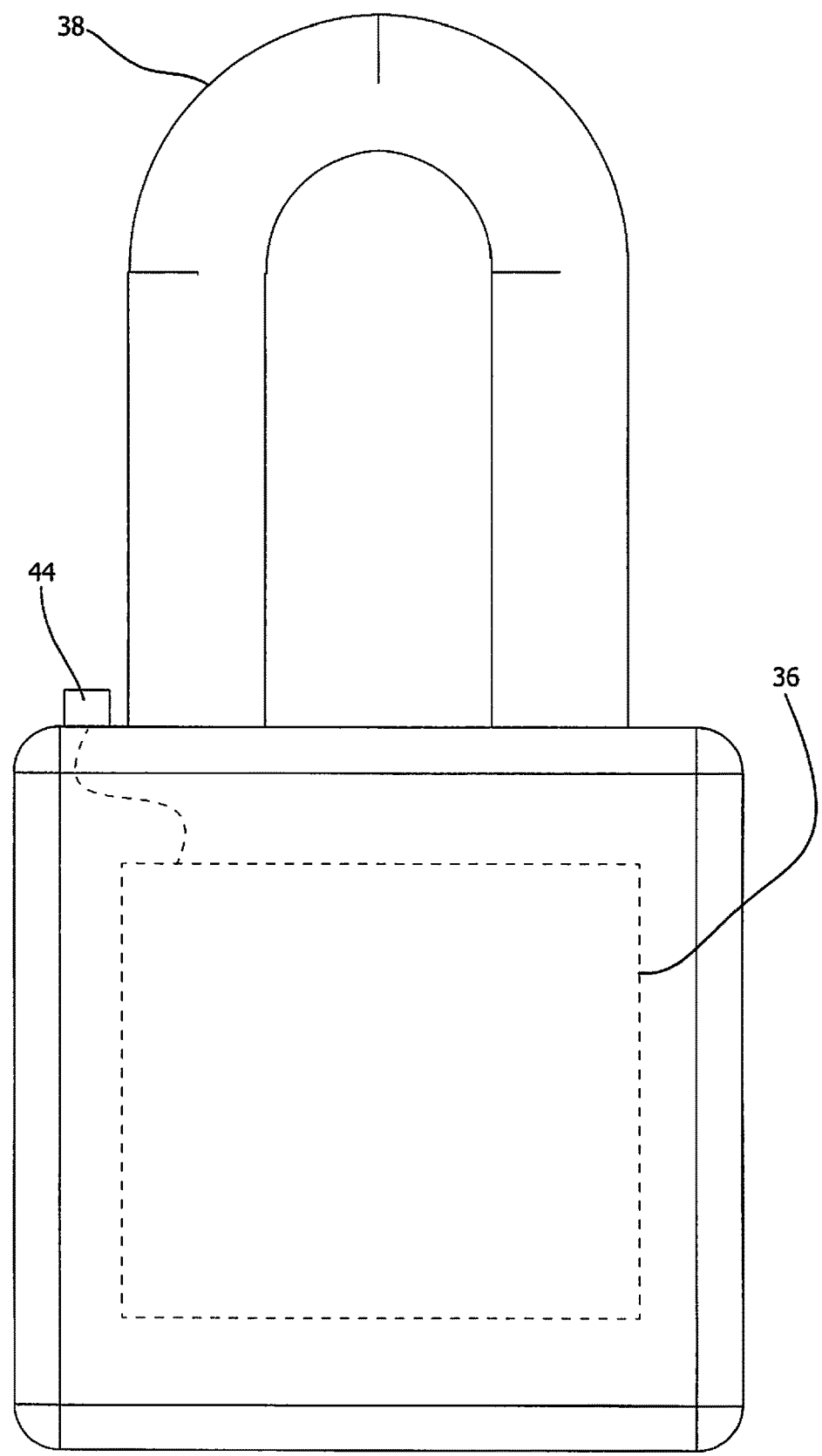
FIG. 3 is a back phantom view of a padlock of an embodiment of the disclosure.
Figure 4:
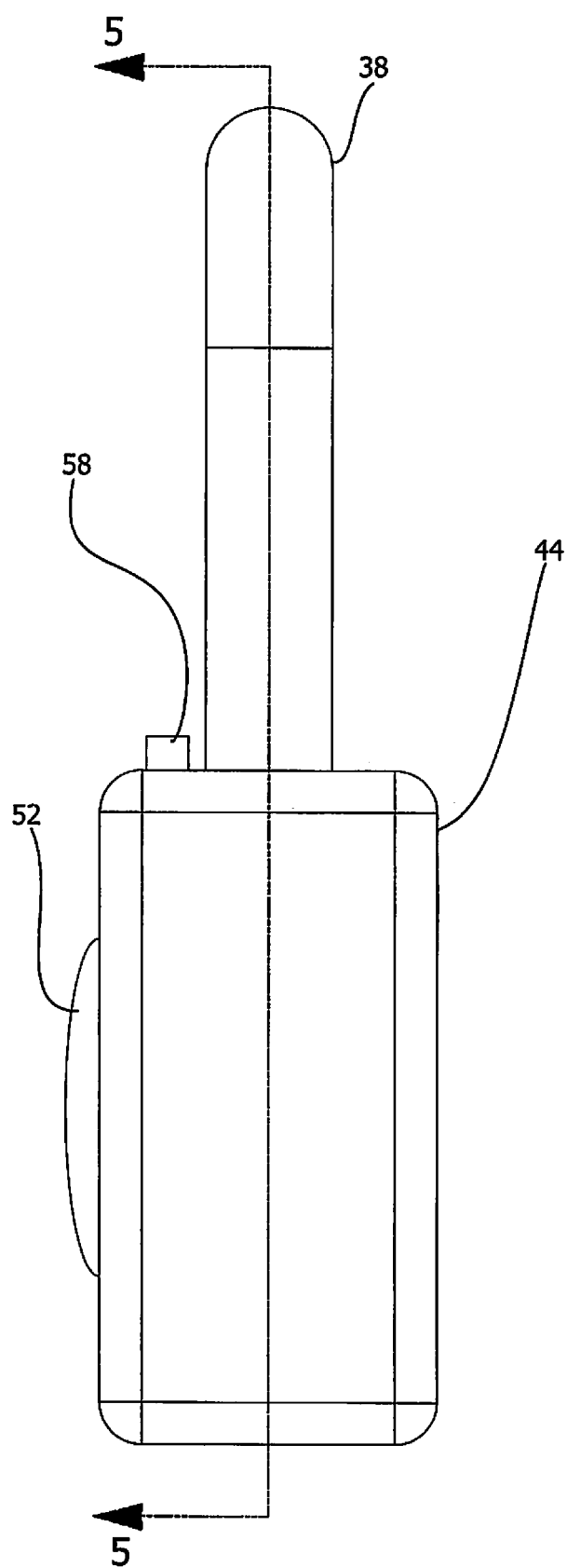
FIG. 4 is a left side view of a padlock of an embodiment of the disclosure.
Figure 5:
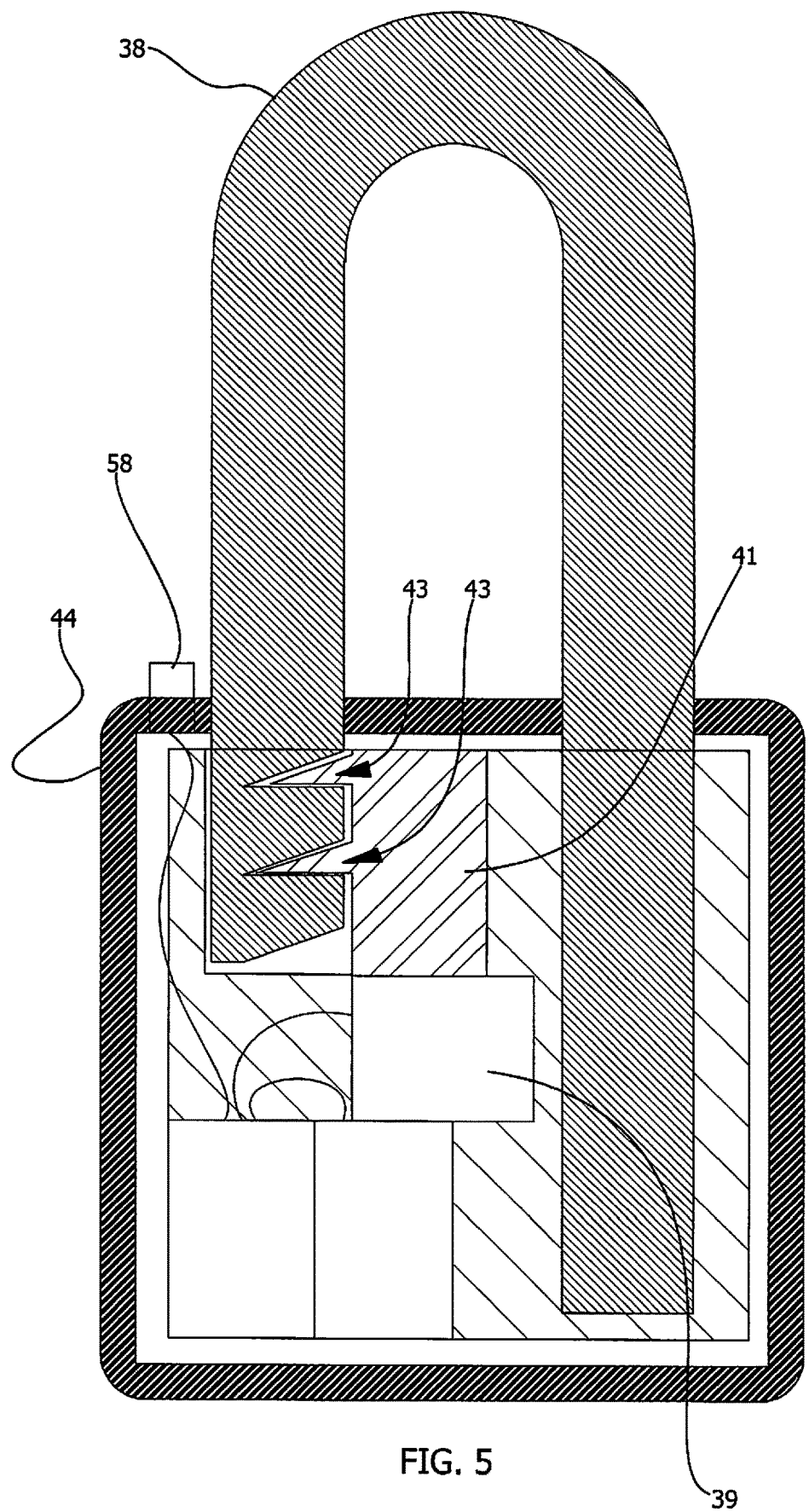
FIG. 5 is a cross sectional view taken along line 5-5 of FIG. 4 of an embodiment of the disclosure.
Figure 6:
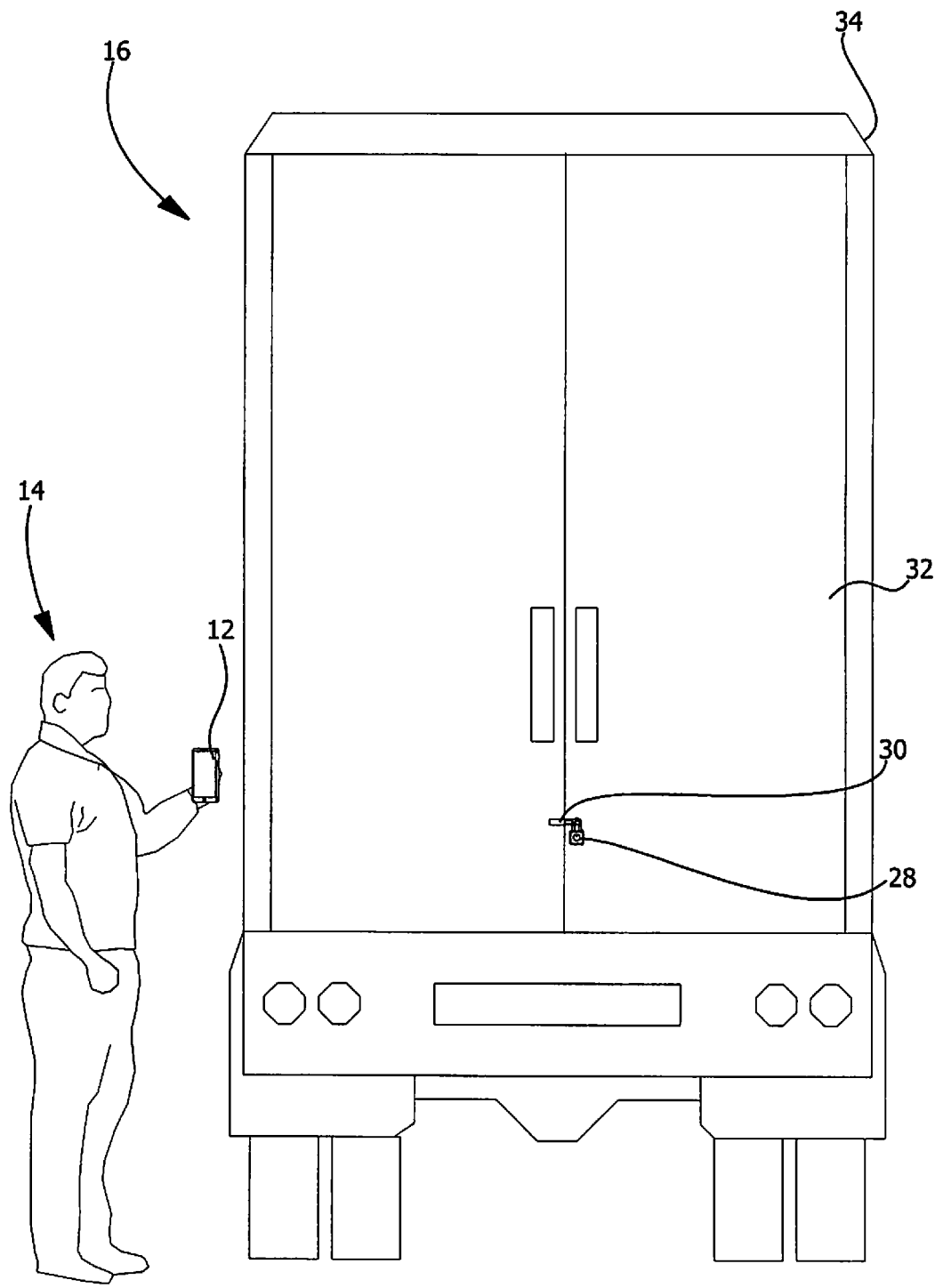
FIG. 6 is a perspective in-use view of an embodiment of the disclosure showing a driver of a cargo vehicle.
Figure 7:
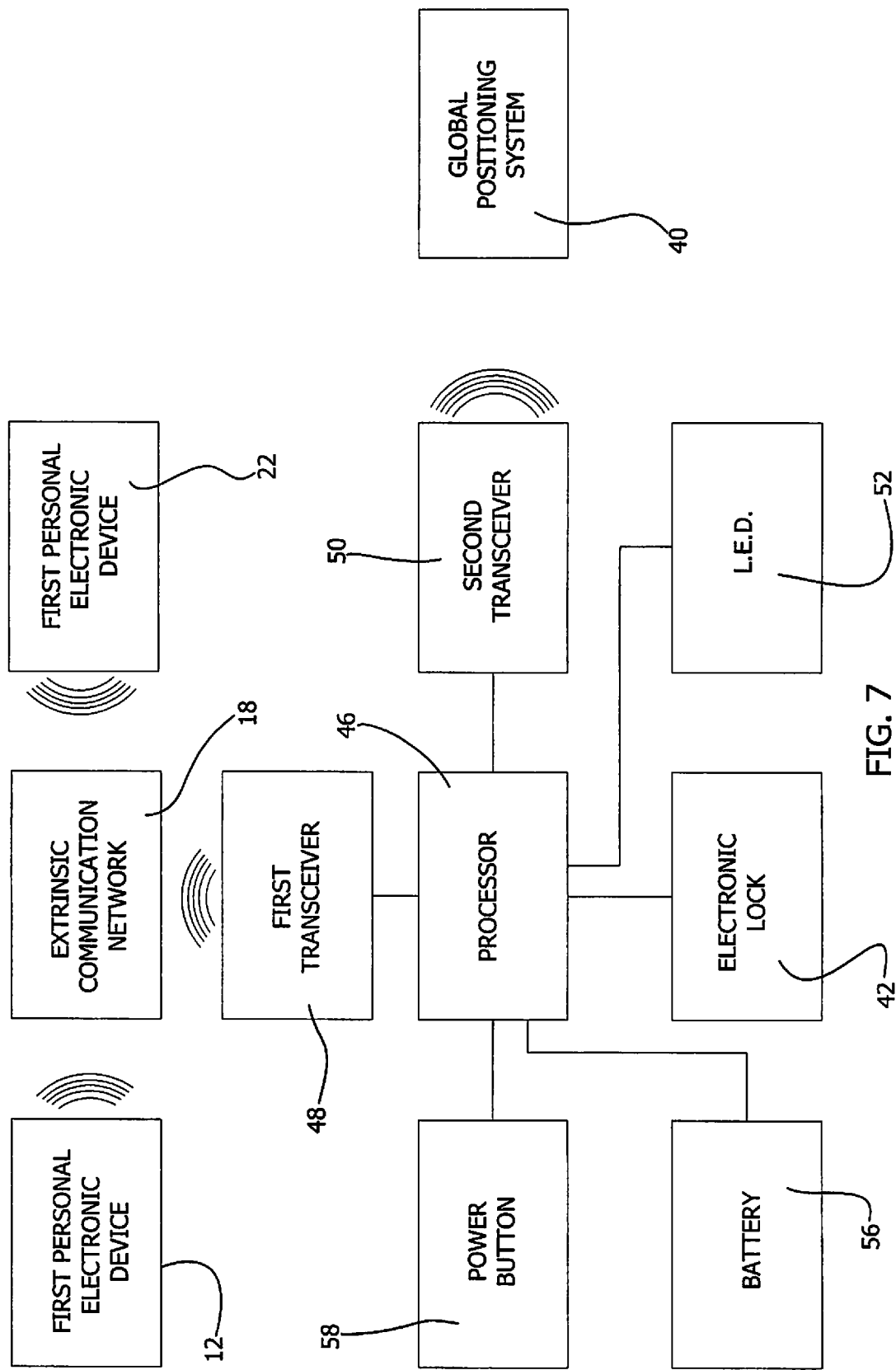
FIG. 7 is a schematic view of an embodiment of the disclosure.
Figure 8:
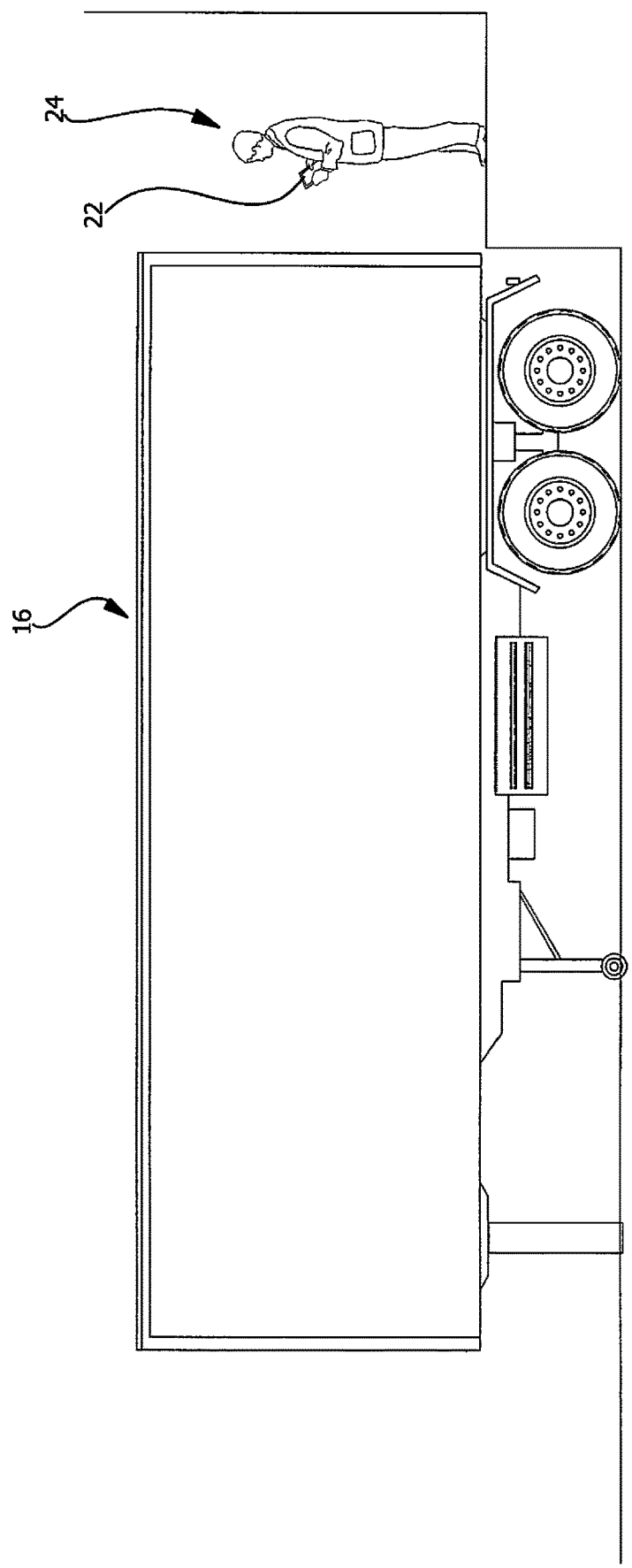
FIG. 8 is a perspective in use view of an embodiment of the disclosure showing a cargo authority.

With reference now to the drawings, and in particular to FIGS. 1 through 8 thereof, a new cargo lock device embodying the principles and concepts of an embodiment of the disclosure and generally designated by the reference numeral 10 will be described.

As best illustrated in FIGS. 1 through 8, the remotely operated cargo lock device 10 generally comprises a first personal electronic device 12 that is carried by a driver 14 of a cargo vehicle 16. The cargo vehicle 16 may be a box van, a semi-trailer or any other type of commercial cargo vehicle and the first personal electronic device 12 may be a smart phone or other electronic device that has wireless communication capabilities. The first personal electronic device 12 is in remote communication with an extrinsic communication network 18 and the extrinsic communication network 18 may comprise the internet, a cellular phone network or any other type of wireless, global communication network. The first personal electronic device 12 stores a first control program 20 which facilitates a trailer number and a seal number to be entered into the first control program 20 thereby facilitating the driver 14 to enter security data regarding cargo being transported in the cargo vehicle 16.

A second personal electronic device 22 is provided which is carried by a cargo authority 24. The cargo authority 24 may be a shipping receiver, a cargo dispatcher or any other individual that is involved in the administration of cargo shipping and the second personal electronic device 22 may be a smart phone or other type of electronic device that has wireless communication capabilities. The second personal electronic device 22 is in remote communication with the extrinsic communication network 18. Additionally, the second personal electronic device 22 stores a second control program 26 which facilitates the trailer number and the seal number to be received from the first personal electronic device 12. In this way the second control program 26 facilitates the cargo authority 24 to verify the security data regarding the cargo being transported in the cargo vehicle 16.

A padlock 28 is provided which is attachable to a handle 30 of a door 32 of a cargo trailer 34 thereby inhibiting the handle 30 from being manipulated into an open position thereby securing cargo in the cargo trailer 34. The padlock 28 includes a communication unit 36 that is in remote communication with the extrinsic communication network 18 thereby facilitating the communication unit 36 to be in remote communication with the first personal electronic device 12 and the second personal electronic device 22. Furthermore, the padlock 28 is actuated into a locked condition when a shackle 38 of the padlock 28 is manipulated into a locking position. In this way the padlock 28 facilitates the driver 14 of the cargo vehicle 16 to lock the handle 30 of the cargo trailer 34 for securing the cargo in the cargo trailer 34.

The padlock 28 is actuated into an unlocked condition when the communication unit 36 receives an unlock command from the second personal electronic device 22. In this way the communication unit 36 facilitates the cargo authority 24 to unlock the handle 30 of the cargo trailer 34 to facilitate the cargo in the cargo trailer 34 to be unloaded. Additionally, the communication unit 36 is in remote communication with a global positioning system 40 thereby facilitating the communication unit 36 to establish a physical location of the padlock 28. In this way the communication unit 36 facilitates the cargo authority 24 to track the location of the cargo trailer 34 when the cargo is being transported.

The padlock 28 includes an electronic lock 42 that is positioned within a body 44 of the padlock 28. The electronic lock 42 engages the shackle 38 of the padlock 28 when the shackle 38 is manipulated into the locking position thereby locking the shackle 38 in the locking position. Conversely, the electronic lock 42 disengages the shackle 38 when the electronic lock 42 is actuated into a disengaging condition thereby facilitating the shackle 38 to be moved into an unlocked position. The electronic lock 42 may include an electric motor 39 and a clasp 41 that is attached to the motor 39 that is rotated to either engage or disengage notches 43 in the shackle 38 when the shackle 38 is moved into the locking position.

The communication unit 36 comprises a processor 46 that is integrated into the body 44 of the padlock 28 and the processor 46 is electrically coupled to the electronic lock 42. The processor 46 receives an unlock input and the electronic lock 42 is actuated into the disengaging condition when the processor 46 receives the unlock input. The communication unit 36 includes a first transceiver 48 that is integrated into the body 44 of the padlock 28 and the first transceiver 48 is electrically coupled to the processor 46. The first transceiver 48 is in wireless communication with the extrinsic communication network 18 and the first transceiver 48 receives the unlock command from the second personal electronic device 22 via the extrinsic communication network 18. Furthermore, the processor 46 receives the unlock input when the first transceiver 48 receives the unlock command. The first transceiver 48 may comprise a radio frequency transceiver or the like and the first transceiver 48 may employ a WPAN signal or other type of communication protocol.

The communication unit 36 includes a second transceiver 50 that is integrated into the body 44 of the padlock 28 and the second transceiver 50 is electrically coupled to the processor 46. The second transceiver 50 is in wireless communication with the global positioning system 40 thereby facilitating the processor 46 to receive the physical location of the padlock 28. In this way the first transceiver 48 broadcasts the physical location to the extrinsic communication network 18 thereby communicating the physical location of the padlock 28 to the cargo authority 24 via the extrinsic communication network 18. The second transceiver 50 may comprise a radio frequency transceiver or the like and the second transceiver 50 operates on a frequency that facilitates the second transceiver 50 to communicate with communication satellites.

The communication unit 36 includes a light 52 that is integrated into the body 44 of the padlock 28 which emits light outwardly from the body 44. The light 52 is electrically coupled to the processor 46 and the light 52 is turned on when the electronic lock 42 engages the shackle 38 to visually communicate that the padlock 28 is locked. The light 52 may comprise a light emitting diode or other type of electronic light. The communication unit 36 includes a power supply 54 that is integrated into the body 44 of the padlock 28 and the power supply 54 is electrically coupled to the processor 46. The power supply 54 comprises a battery 56 that is integrated into the body 44 of the padlock 28 and the battery 56 is electrically coupled to the processor 46. The power supply 54 includes a power button 58 that is movably integrated into the body 44 of the padlock 28. The power button 58 is electrically coupled to the processor 46 for turning the processor 46 on and off when the power button 58 is depressed.

In use, the driver 14 locks the padlock 28 to the handle 30 of the cargo trailer 34 and the driver 14 inputs the trailer number and the seal number into the first control program 20. Additionally, the cargo authority 24 is notified that the padlock 28 has been locked and the trailer number and seal number are communicated to the second personal electronic device 22. Furthermore, the cargo authority 24 can track the location of the padlock 28 while the cargo is in transit. The cargo authority 24 inputs the seal number into the second control program 26 to actuate the electronic lock 42 into the disengaging condition. In this way the padlock 28 can be removed from the handle 30 of the cargo trailer 34 thereby facilitating the cargo to be unloaded. The currently existing method of sealing cargo trailers involves the use of single use seals that must be cut from the handle 30 and which typically end up collecting on the ground at the cargo receiver. The aforementioned device eliminates the need to cut single use seals from the handle 30 of the cargo trailer 34 and reduces the likelihood of the cargo being stolen.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remotely operated cargo lock device for locking a door on a semi-trailer while cargo is being delivered in the semi-trailer, said device comprising:
a first personal electronic device being configured to be carried by a driver of a cargo vehicle, said first personal electronic device being in remote communication with an extrinsic communication network, said first personal electronic device storing a first control program which facilitates a trailer number and a seal number to be entered into said control program wherein said first control program is configured to facilitate the driver to enter security data regarding cargo being transported in the cargo vehicle;
a second personal electronic device being configured to be carried by a cargo authority, said second personal electronic device being in remote communication with said extrinsic communication network, said second personal electronic device storing a second control program which facilitates the trailer number and the seal number to be received from said first personal electronic device wherein said second control program is configured to facilitate the cargo authority to verify the security data regarding the cargo being transported in the cargo vehicle; and
a padlock being attachable to a handle of a cargo trailer door thereby inhibiting said handle from being manipulated into an open position thereby securing cargo in said cargo trailer, said padlock including a communication unit being in remote communication with said extrinsic communication network thereby facilitating said communication unit to be in remote communication with said first personal electronic device and said second personal electronic device, said padlock being actuated into a locked condition when a shackle of said padlock is manipulated into a locking position wherein said padlock is configured to facilitate the driver of the cargo vehicle to lock said handle of said cargo trailer for securing the cargo in said cargo trailer, said padlock being actuated into an unlocked condition when said communication unit receives an unlock command from said second personal electronic device wherein said communication unit is configured to facilitate the cargo authority to unlock said handle of said cargo trailer to facilitate the cargo in said cargo trailer to be unloaded, said communication unit being in remote communication with a global positioning system thereby facilitating said communication unit to establish a physical location of said padlock wherein said communication unit is configured to facilitate the cargo authority to track the location of said cargo trailer when the cargo is being transported.

2. The device according to claim 1, wherein said padlock includes an electronic lock being positioned within a body of said padlock, said electronic lock engaging said shackle of said padlock when said shackle is manipulated into said locking position thereby locking said shackle in said locking position, said electronic lock disengaging said shackle when said electronic lock is actuated into a disengaging condition thereby facilitating said shackle to be moved into an unlocked position.

3. The device according to claim 1, wherein:
said padlock includes an electronic lock when engages said shackle when said shackle is moved into said locking position; and
said communication unit comprises:
a processor being integrated into said body of said padlock, said processor being electrically coupled to said electronic lock, said processor receiving an unlock input, said electronic lock being actuated into said disengaging condition when said processor receives said unlock input; and
a first transceiver being integrated into said body of said padlock, said first transceiver being electrically coupled to said processor, said first transceiver being in wireless communication with said extrinsic communication network, said first transceiver receiving said unlock command from said second personal electronic device via said extrinsic communication network, said processor receiving said unlock input when said first transceiver receives said unlock command.

4. The device according to claim 3, wherein said communication unit includes a second transceiver being integrated into said body of said padlock, said second transceiver being electrically coupled to said processor, said second transceiver being in wireless communication with said global positioning system thereby facilitating said processor to receive the physical location of said padlock such that said first transceiver broadcasts the physical location to said extrinsic communication network wherein said first transceiver is configured to communicate the physical location of said padlock to the cargo authority via said extrinsic communication network.

5. The device according to claim 3, wherein said communication unit includes:
a light being integrated into said body of said padlock wherein said light is configured to emit light outwardly from said body, said light being electrically coupled to said processor, said light being turned on when said electronic lock engages said shackle wherein said light is configured to visually communicate that said padlock is locked; and
a power supply being integrated into said body of said padlock, said power supply being electrically coupled to said processor, said power supply comprising:
a battery being integrated into said body of said padlock, said battery being electrically coupled to said processor; and
a power button being movably integrated into said body of said padlock, said power button being electrically coupled to said processor for turning said processor on and off when said power button is depressed.

6. A remotely operated cargo lock device for locking a door on a semi-trailer while cargo is being delivered in the semi-trailer, said device comprising:
- a first personal electronic device being configured to be carried by a driver of a cargo vehicle, said first personal electronic device being in remote communication with an extrinsic communication network, said first personal electronic device storing a first control program which facilitates a trailer number and a seal number to be entered into said control program wherein said first control program is configured to facilitate the driver to enter security data regarding cargo being transported in the cargo vehicle;
- a second personal electronic device being configured to be carried by a cargo authority, said second personal electronic device being in remote communication with said extrinsic communication network, said second personal electronic device storing a second control program which facilitates the trailer number and the seal number to be received from said first personal electronic device wherein said second control program is configured to facilitate the cargo authority to verify the security data regarding the cargo being transported in the cargo vehicle;
- a padlock being attachable to a handle of a cargo trailer door thereby inhibiting said handle from being manipulated into an open position thereby securing cargo in said cargo trailer, said padlock including a communication unit being in remote communication with said extrinsic communication network thereby facilitating said communication unit to be in remote communication with said first personal electronic device and said second personal electronic device, said padlock being actuated into a locked condition when a shackle of said padlock is manipulated into a locking position wherein said padlock is configured to facilitate the driver of the cargo vehicle to lock said handle of said cargo trailer for securing the cargo in said cargo trailer, said padlock being actuated into an unlocked condition when said communication unit receives an unlock command from said second personal electronic device wherein said communication unit is configured to facilitate the cargo authority to unlock said handle of said cargo trailer to facilitate the cargo in said cargo trailer to be unloaded, said communication unit being in remote communication with a global positioning system thereby facilitating said communication unit to establish a physical location of said padlock wherein said communication unit is configured to facilitate the cargo authority to track the location of said cargo trailer when the cargo is being transported, said padlock including an electronic lock being positioned within a body of said padlock, said electronic lock engaging said shackle of said padlock when said shackle is manipulated into said locking position thereby locking said shackle in said locking position, said electronic lock disengaging said shackle when said electronic lock is actuated into a disengaging condition thereby facilitating said shackle to be moved into an unlocked position, said communication unit comprising:
  - a processor being integrated into said body of said padlock, said processor being electrically coupled to said electronic lock, said processor receiving an unlock input, said electronic lock being actuated into said disengaging condition when said processor receives said unlock input;
  - a first transceiver being integrated into said body of said padlock, said first transceiver being electrically coupled to said processor, said first transceiver being in wireless communication with said extrinsic communication network, said first transceiver receiving said unlock command from said second personal electronic device via said extrinsic communication network, said processor receiving said unlock input when said first transceiver receives said unlock command;
  - a second transceiver being integrated into said body of said padlock, said second transceiver being electrically coupled to said processor, said second transceiver being in wireless communication with said global positioning system thereby facilitating said processor to receive the physical location of said padlock such that said first transceiver broadcasts the physical location to said extrinsic communication network wherein said first transceiver is configured to communicate the physical location of said padlock to the cargo authority via said extrinsic communication network;
  - a light being integrated into said body of said padlock wherein said light is configured to emit light outwardly from said body, said light being electrically coupled to said processor, said light being turned on when said electronic lock engages said shackle wherein said light is configured to visually communicate that said padlock is locked; and
  - a power supply being integrated into said body of said padlock, said power supply being electrically coupled to said processor, said power supply comprising:
    - a battery being integrated into said body of said padlock, said battery being electrically coupled to said processor; and
    - a power button being movably integrated into said body of said padlock, said power button being electrically coupled to said processor for turning said processor on and off when said power button is depressed.

* * * * *